United States Patent [19]

Brandeberry et al.

[11] 3,935,032
[45] Jan. 27, 1976

[54] SHEATHED THERMOCOUPLE

[75] Inventors: Raymond L. Brandeberry, Toledo; Glen J. Lehr, Oregon; Denzil W. Stacy, Toledo, all of Ohio

[73] Assignee: Libbey-Owens-Ford Company, Toledo, Ohio

[22] Filed: Nov. 15, 1973

[21] Appl. No.: 416,017

[52] U.S. Cl. .................................. 136/230; 73/359
[51] Int. Cl.² ......................................... G01K 7/00
[58] Field of Search ............................... 136/230–; 73/359

[56] References Cited
UNITED STATES PATENTS

| 2,531,993 | 10/1970 | Karn | 73/359 |
| 2,815,663 | 12/1957 | Lupfer | 136/230 |
| 2,906,800 | 9/1959 | Darken | 136/230 |
| 3,589,192 | 6/1971 | Sabovik | 73/359 |
| 3,672,222 | 6/1972 | Stelts et al. | 73/359 |

Primary Examiner—Verlin R. Pendegrass
Attorney, Agent, or Firm—Collins, Oberlin & Darr

[57] ABSTRACT

A thermocouple for measuring the temperatures of hot gases up to and above 3000° F. with surroundings at the same or different temperatures, the thermocouple having its hot junction encased in a protective sheath which is detachably sealingly connected to the hot end of an elongated tubular housing containing thermocouple leads insulated both atmospherically and electrically. These leads extend back through the length of the housing and pass through an insulative sealing bushing disposed in the cold end of the housing for connection to a suitable recording instrument. The interior chamber defined by the sheath, housing and bushing is pressurized to assure that the interior chamber is atmospherically insulated and to prevent the hot gases from penetrating into the interior chamber and, together with effects of condensation, deteriorating the hot junction and the leads of the thermocouple and/or creating short circuits.

7 Claims, 3 Drawing Figures

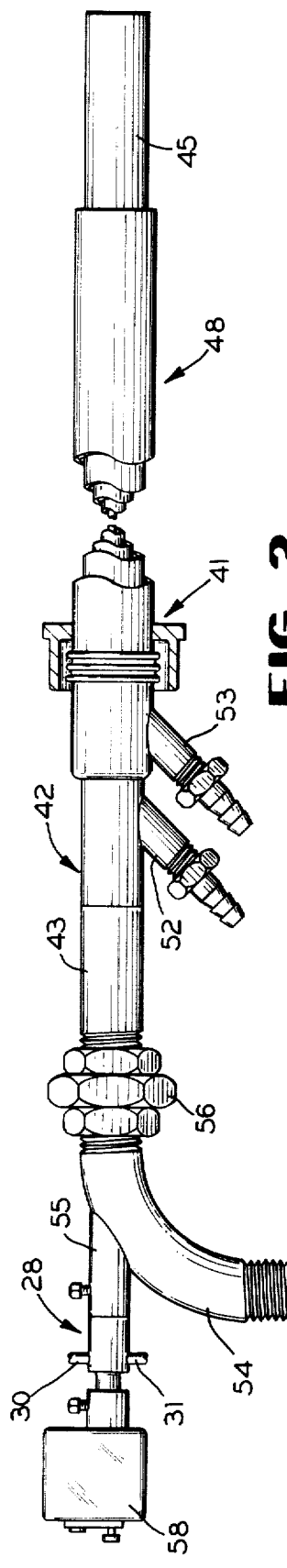
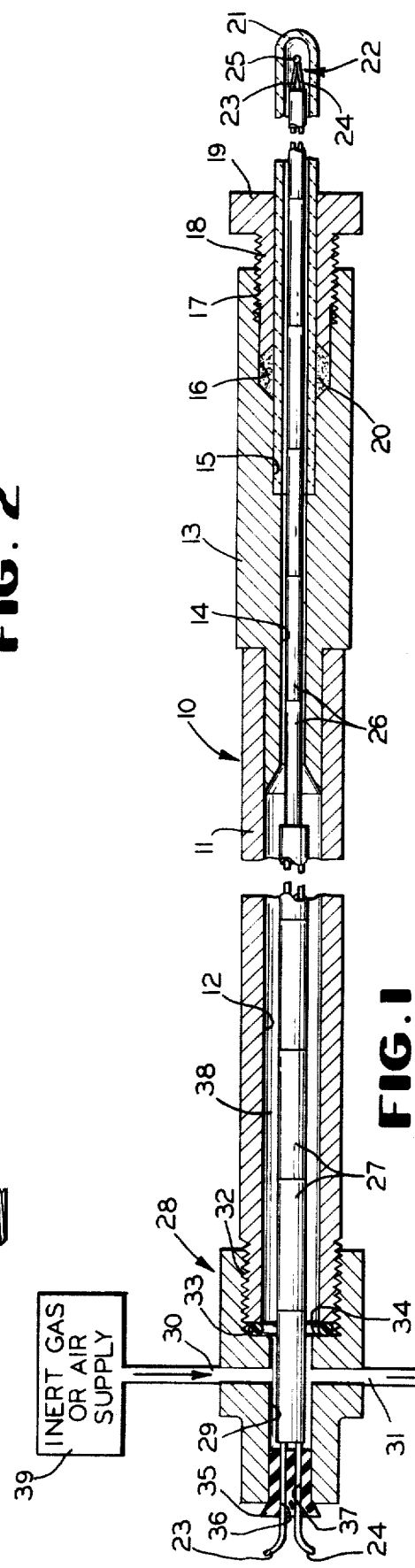
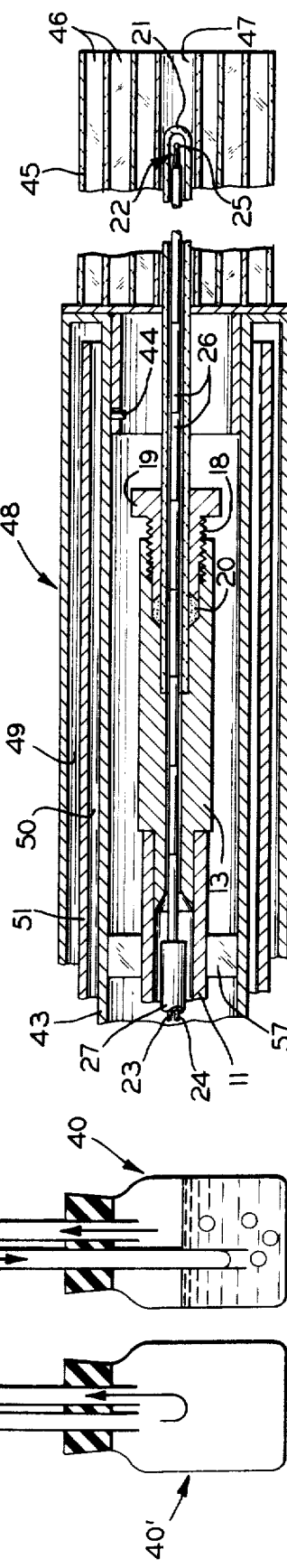

SHEATHED THERMOCOUPLE

BACKGROUND OF THE INVENTION

1. Field of the Invention

This invention generally relates to thermocouples for measuring temperatures of hot gases and, more particularly, to sheathed thermocouples having a pressurized interior chamber for atmospherically insulating the encased thermocouple leads and its hot junction.

2. Description of the Prior Art

It is desirable in the glass making industry to measure accurately the temperatures of the gases at different locations in the over-all system of producing glass, particularly the gas temperatures in a glass melting furnace occurring at its ports, regenerators, tunnels, flues, chimney and ejectors. Measured under actual operating conditions the temperatures serve as bases for improvements in operations, modifications in design, and fuel and power savings. As a result, longer furnace life, higher tonnages, improved quality, and lower costs for the production of glass may be achieved.

In a conventional glass melting furnace, fuel is alternately fired, using preheated combustion air, from one side and then the other through a series of ports along each side of the tank at right angles to the flow of molten glass. The raw materials are continually fed in at one end of the tank and molten glass is removed from its other end. The variations and conditions at the various ports down each side of the tank are therefore important in determining the variations in temperature undergone by the raw materials during melting and the glass after melting.

In such glass melting furnace systems, the temperature of the combustion air and exhaust gases may be substantially different from the temperature of their surrounding bodies, and the heat exchanged by radiation between the bodies and thermocouple may be predominant over that by convection. The exchange by radiation from or to the adjacent bodies influence the thermocouple reading so that it may indicate the temperature of such bodies or some temperature in between the bodies and the exhaust gases or combustion air rather than the temperature of the exhaust gases or combustion air.

Thus, in order to measure accurately the temperatures of these exhaust gases or combustion air whose temperatures are different than those of their surroundings, aspirating pyrometers may be employed. Such aspirating pyrometers may include a metal thermocouple tube centered within an aspirated gas stream extending the length of the pyrometer. A metal thermocouple sheath holder may be threadedly connected to the hot end thereof and, in turn, a closed end ceramic thermocouple sheath which extends inside a radiation shield assembly is normally sealed to the holder by a refractory cement.

The importance of protecting the thermocouple from the gases by means of a sheath not only to preserve the thermocouple but also to prevent false readings, is self evident. However, even though the thermocouple is protected by a ceramic sheath, it can progressively lose its electromotive force on account of its being indirectly attacked and contaminated by the hot gases and condensation which may have permeated the sheath, seal and holder, as well as by direct attack if the sheath, seal and holder have deteriorated or broken.

The periodic reversal of firing and gas flow through a glass melting furnace presents a problem as waste combustion gases carry highly corrosive fluxes from the tank, and the pyrometer used for measuring the temperature of the preheated combustion air must be protected from such corrosive gases and condensation, particularly in cases when the aspirated flow is reduced to zero as required for calibration of the pyrometer under operating conditions. These highly corrosive fluxes from the melting tank can pass through the sheath, seal, holder, or housing by reason of their porosity, deterioration, or being broken, and can attack the thermocouple and modify its readings as a result of this, or loss of insulation electrically from effects of condensation or destroy its hot junction.

One attempt to overcome this problem is shown in U.S. Pat. No. 1,615,451, issued Jan. 25, 1927. As shown therein, an air flow path is provided so that atmospheric air can traverse the interior of the thermocouple protector tube and carry off any corrosive gases which have penetrated the protector tube. However, the corrosive gases or condensation still physically contact the thermocouple and can thus attack, cause loss of effective insulation, and destroy the junction thereof. This is true even for the embodiment shown in FIGS. 3 and 4 since the gas can penetrate the inner casing tube H.

SUMMARY OF THE INVENTION

Generally speaking, the sheathed thermocouple of this invention overcomes the aforementioned problems and permits accurate measurement of the actual gas temperatures. To this end, the sheathed thermocouple generally comprises an elongated tubular housing adapted to receive thermocouple leads of dissimilar metal which are joined together at one of their ends externally of the housing to form a hot junction, the purpose of which is well known in the art. This end of the housing, commonly called the hot end, is adapted to receive the open end of a refractory sheath which encases the hot junction. The refractory sheath is detachably secured to the housing by a packing and gland arrangement which also seals this end of the interior chamber defined by the sheath and the housing from the surrounding atmosphere. At the other or cold end of the housing, the thermocouple leads pass through an insulative bushing which also seals this end of the interior chamber from the surrounding atmosphere.

The cold end of the housing is also provided with an inlet port through which air under pressure is passed into the interior chamber to prevent the penetration of corrosive gases through the refractory sheath. Also, the cold end of the housing is provided with an outlet port which is connected to a pressure flow indicator which indicates that the interior chamber is either pressurized or that the sheath is cracked or broken.

OBJECTS AND ADVANTAGES

An object of this invention is to provide a sheathed thermocouple with simple, efficient and effective means for protecting the thermocouple leads and its hot junction from contacting the gases whose temperature is to be measured and effects of condensation.

Another object of this invention is to provide a sheathed thermocouple in which a malfunction or breakdown thereof is easily detectable.

Yet another object of this invention is to provide a sheathed thermocouple which is accurate, has a continuously reliable operation as well as being sensitive, has a fast rate of response, and is easily maintained.

Other objects and advantages of the invention will become more apparent during the course of the following description when read in connection with the accompanying drawings.

BRIEF DESCRIPTION OF THE DRAWINGS

In the drawings, wherein like numerals are employed to designate like parts throughout the same:

FIG. 1 is an axial cross-sectional view of a sheathed thermocouple constructed in accordance with this invention;

FIG. 2 is an elevational view of the sheathed thermocouple incorporated with an aspirating pyrometer; and FIG. 3 is an enlarged fragmentary view of the hot end of the aspirating pyrometer shown in FIG. 2.

DESCRIPTION OF THE PREFERRED EMBODIMENT

Although the sheathed thermocouple constructed in accordance with this invention will be described in conjunction with an aspirating pyrometer for measuring combustion air and exhaust gas temperatures which are different from those of its surrounding environment, such as in a glass melting furnace, it will be apparent that it can also be used in other environments where the use of an aspirator and/or radiation shield is not necessary.

Referring now to FIG. 1, the sheathed thermocouple indicated generally by the reference numeral 10, is an elongated tubular structure having an elongated tubular housing 11 provided with a central axial bore 12 extending therethrough. For convenience, a combination sheath holder and packing box adapter 13 is secured to the forward or hot end thereof by suitable means such as by welding. This adapter 13 is provided with a central axial bore 14 which has a shouldered counterbore 15. The forward end of this adapter 13 is provided with a packing box 16 and internal threads 17 which receive the threaded end of a gland nut 18 which is provided with a headed end 19 by which it may be turned into or backed away from a packing 20 contained within the packing box 16. The packing 20, used in packing box 16 may be a refractory fiber material such as zirconium oxide or aluminum silicate. The tubular housing 11 and the combination sheath holder and packing adapter 13 are preferably composed of a metallic alloy resistant to heat and corrosion.

A refractory sheath 21 having one end closed has its other open end inserted within the shouldered counterbore 15 in close fitting telescoping relation therewith and abuts against the shoulder at a distance beyond the packing 20. Thus, as can best be seen in FIG. 1, the gland nut 18 may be turned into the packing box 16 and the packing 20 is compressed into sealing engagement with and securely holds the sheath 21 in the adapter 13. On the other hand, the gland nut 18 may be backed away from the packing box 16 and the compressive pressure on the packing 20 and the sheath 21 is released and the sheath may be removed from the adapter 13 for its replacement or access into the interior of the adapter 13.

A thermocouple 22 consisting of leads 23 and 24 of dissimilar metal are joined together at their forward ends to form a hot junction 25. This hot junction 25 is encased in the closed end of the refractory sheath 21, and the leads 23 and 24 then extend back throughout the length of the sheath 21, adapter 13 and tubular housing 11 within a first series of two hole insulators 26 which extend from the sheath 21 into the bore 12 of the housing 11 and which electrically insulate the leads from each other. To further protect the leads 23 and 24 from corrosion as well as electrically insulate them from each other, a second series of two hole insulators 27 are strung on the leads 23 and 24 and extend back from the first series of insulators 26 through the bore 12 of the housing 11 to its cold end.

A take-off coupling 28 having an axial bore 29, an inlet port 30, and an outlet port 31, is affixed to the cold end of the tubular housing by a threaded connection 32. An O-ring seal 33 is disposed between the end of the housing 11 and a shoulder 34 provided in the bore 29 to seal the coupling 28 to the housing 11.

An insulative bushing 35 having a pair of axially extending apertures 36 and 37 through which the thermocouple leads 23 and 24 sealingly pass, is inserted in close fitting relationship into the open end of the bore 29 so that the coupling 28, tubular housing 11, and thermocouple sheath 21, define a closed chamber 38 which may be pressurized to positively seal it from the surrounding atmosphere.

The pressurization of the chamber 38 has a two-fold purpose, one of which is to indicate whether the sheath 21 is intact or might be cracked or broken, and the other is to prevent the gases being measured from penetrating the sheath 26 so that adverse effects of the gas on the thermocouple leads and its hot junction may be avoided. To this end, the inlet port 30 is connected to a source 39 of inert gas or air under pressure and the outlet port 31 is connected to a pressure flow indicator such as a bubbler device 40, diagrammatically shown in FIG. 1. A pressure above atmospheric pressure is thus applied to the chamber 38. A trap 40' is connected between the outlet port 31 and the bubbler device 40 to prevent water from the bubbler device 40 from being drawn into the chamber 38 and short-circuiting the thermocouple 22 in case the sheath 21 breaks or deteriorates.

As previously indicated, an aspirating pyrometer 41 is used for measuring the high temperatures required in melting glass. Thus, as shown in FIG. 2, the sheathed thermocouple 10 is combined with an aspirating device 42 to form an aspirating pyrometer such as shown in U.S. Pat. No. 2,833,844, issued May 6, 1958. Generally speaking, the aspirating device 42 comprises a tubular body 43 at the forward end of which is detachably mounted, as by a bayonet fastener 44 (see FIG. 3), a radiation shield 45 normally composed of refractory material. The radiation shield may be a cylindrical block having a large number of cylindrical passages 46 of small diameter surrounding and parallel to a central axial passageway 47 for receiving the forward end of the sheath 21. As shown in FIG. 3, the forward part of the body 43 is provided with a water jacket 48 separated into two chambers 49 and 50 by a partition 51, the two chambers 49 and 50 being interconnected at their forward end. An inlet connection 52 supplies cooling water to the inner chamber 50 and the outer chamber 49 discharges the water therefrom via an outlet connection 53. An outlet pipe 54 is secured to the rear end of the body 43 as by a union 56 for connection to an aspirator (not shown) so that a portion of the gas whose temperature is to be measured may be drawn through the passageway 47 in the refractory shield 45 and passed over the sheath 21. Thus, a flow of hot gases into and through the pyrometer 41 is established by the aspirator pulling the gases through the passageway 47 containing the sheathed thermocouple 25 into the tubular body 43 and out of the pipe 54.

The sheathed thermocouple 10 (see FIG. 1) is inserted as seen in FIG. 2, into a tube 55 emerging in line with the axis of the body 43 through a bend in the pipe 54. A centering spider 57 is provided adjacent the hot end of the housing 11 for centering the sheathed thermocouple 10 within the body 43. Also, as shown in FIG. 2, a conventional reel box 58 containing a reserve of each thermocouple lead 23 and 24 may be mounted on the end of the coupling 28. Thus, when it becomes necessary to renew the hot junction 25, the leads 23 and 24 are withdrawn from the box 58 and the hot junction 25 can be remade.

The position of the sheath thermocouple 21 within the body 43 may be adjusted by sliding it back and forth therein. As shown, the hot junction 25 encased in the sheath 21 is located beyond the cooling effect of the water and back of the position in the refractory shield 45 where it would receive any substantial amount of radiant heat. Also, the housing 11 is located within the cooling jacket 28 behind the refractory shield 45 where the temperature of the aspirated gas stream is lowered so it will not have any deteriorating effect on the hot end of the housing 11.

It is to be understood that the form of the invention herewith shown and described is to be taken as an illustrative embodiment only of the same, and that various changes in the shape, size and arrangement of the parts may be resorted to without departing from the spirit of the invention.

We claim:

1. In a sheathed thermocouple for measuring the temperature of hot gases of the type having a pair of dissimilar conductors joined together at one of their ends to form a hot junction, which conductors are contained in a chamber sealed from the surrounding atmosphere and said hot junction extends into a refractory sheath, said refractory sheath together with an elongated tubular housing defining the sealed chamber, the tubular housing being provided with a hot and a cold end, and the hot end of the housing having an elongated bore for telescopically receiving the open end of the sheath, the improvement comprising:
   a. connecting means detachably and sealingly attaching the open end of said sheath in the bore provided in the hot end of said tubular housing for forming one end of said chamber;
   b. seal means attached to the cold end of said tubular housing for forming the other end of the chamber and including means to sealingly pass the conductors therethrough; and
   c. means for pressurizing and maintaining a positive pressure in the chamber defined by said sheath and said tubular housing for preventing the hot gases being measured from penetrating said sheath and deteriorating said hot junction of said thermocouple.

2. A sheathed thermocouple for measuring the temperature of hot gases as claimed in claim 8, wherein said connecting means includes:
   a. an adapter affixed to the hot end of said housing and having a shouldered central bore wherein said sheath is coaxially received in said bore in close fitting relation thereto with its open end seated against said shoulder;
   b. a packing surrounding said sheath intermediate the ends of the bore; and
   c. a packing nut which is threadedly received in said adapter and bears against said packing for compressing said packing into sealing engagement adjacent to and between said sheath and the wall of said adapter defining the bore.

3. A sheathed thermocouple for measuring the temperature of hot gases as claimed in claim 8, wherein said tubular housing is provided with an inlet port adjacent its cold end and said pressurizing means includes a source of gas under pressure which is connected to said inlet port for pressurizing the sealed chamber.

4. A sheathed thermocouple for measuring the temperature of hot gases as claimed in claim 10, wherein said tubular housing is provided with an outlet port adjacent its cold end and including means connected thereto for indicating the presence of gaseous pressure in the sealed chamber.

5. A sheathed thermocouple for measuring the temperature of hot gases as claimed in claim 4, wherein said pressure indicating means is a bubbler device.

6. A sheathed thermocouple for measuring the temperature of hot gases as claimed in claim 4, wherein said pressure indicating means includes a trap.

7. A sheathed thermocouple for measuring the temperature of hot gases as claimed in claim 1, wherein said seal means is an insulating bushing inserted within the cold end of said housing.

* * * * *

UNITED STATES PATENT OFFICE
CERTIFICATE OF CORRECTION

PATENT NO. : 3,935,032
DATED : January 27, 1976
INVENTOR(S) : Raymond L. Brandeberry et al It is certified that error appears in the above-identified patent and that said Letters Patent are hereby corrected as shown below:

Col. 6, line 14, "8" should be --1--
line 29, "8" should be --1--
line 35, "10" should be --3--

Signed and Sealed this sixth Day of April 1976

[SEAL]

Attest:

RUTH C. MASON
Attesting Officer

C. MARSHALL DANN
Commissioner of Patents and Trademarks